United States Patent [19]

Giroir et al.

[11] Patent Number: 4,672,536

[45] Date of Patent: Jun. 9, 1987

[54] ARBITRATION METHOD AND DEVICE FOR ALLOCATING A SHARED RESOURCE IN A DATA PROCESSING SYSTEM

[75] Inventors: Didier Giroir, Antibes; Gérard Lacoste, Nice, both of France

[73] Assignee: International Business Machines Corporation, Armonk, N.Y.

[21] Appl. No.: 593,208

[22] Filed: Mar. 26, 1984

[30] Foreign Application Priority Data

Mar. 29, 1983 [EP] European Pat. Off. ........ 83430012.1

[51] Int. Cl.$^4$ .............................................. G06F 9/00
[52] U.S. Cl. .................................................. 364/200
[58] Field of Search ............................... 364/200, 900

[56] References Cited

U.S. PATENT DOCUMENTS

| | | | |
|---|---|---|---|
| 3,334,191 | 8/1967 | Arseneau | 179/27 |
| 4,096,571 | 6/1978 | van der Mey | 364/200 |
| 4,409,656 | 10/1983 | Andersen et al. | 364/200 |
| 4,417,303 | 11/1983 | Korowitz et al. | 364/200 |
| 4,453,214 | 6/1984 | Adcock | 364/200 |
| 4,484,273 | 11/1984 | Stiffler et al. | 364/200 |
| 4,488,218 | 12/1984 | Grimes | 364/200 |
| 4,499,538 | 2/1985 | Finger et al. | 364/200 |

Primary Examiner—Thomas M. Heckler
Assistant Examiner—John G. Mills
Attorney, Agent, or Firm—D. Kendall Cooper

[57] ABSTRACT

An arbitration method and device for a data processing system wherein N units share a common resource, to allocate the shared resource to a given unit selected from a number of units requesting access thereto.

An age value is assigned to each unit and corresponds to the age of the request that will be made by the unit. During an arbitration cycle, a unit whose request will be serviced, if the shared resource becomes available, is selected, this unit being the one whose request has an age value corresponding to the oldest request. Then, the age value associated with each unit is updated when the resource is available, the age of the selected unit assuming a value corresponding to that of the most recent request, the ages of the units not selected that correspond to requests more recent than the one made by the selected unit being increased by a given quantity, and the ages of the units not selected that correspond to requests older than the one made by the selected unit remaining unchanged.

2 Claims, 14 Drawing Figures

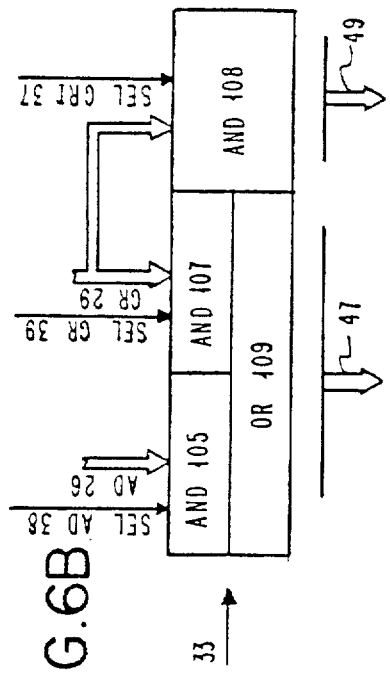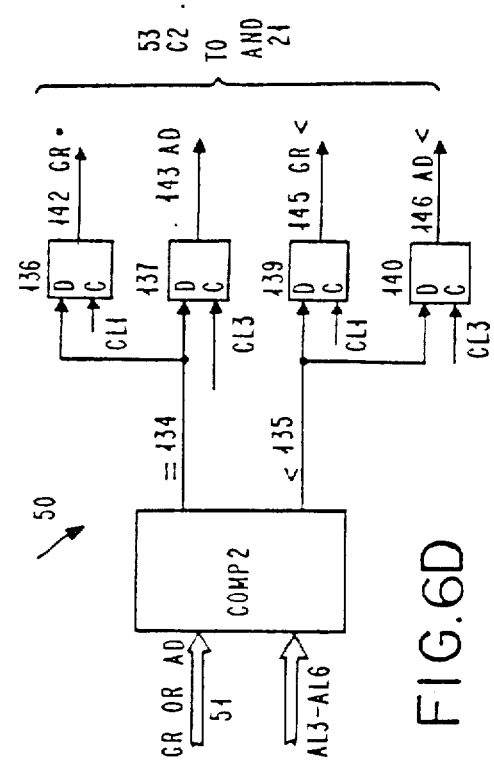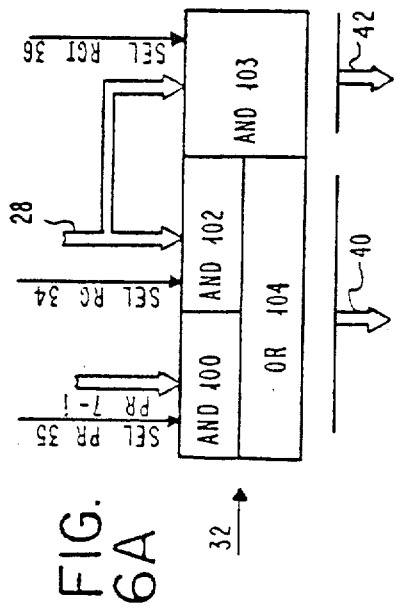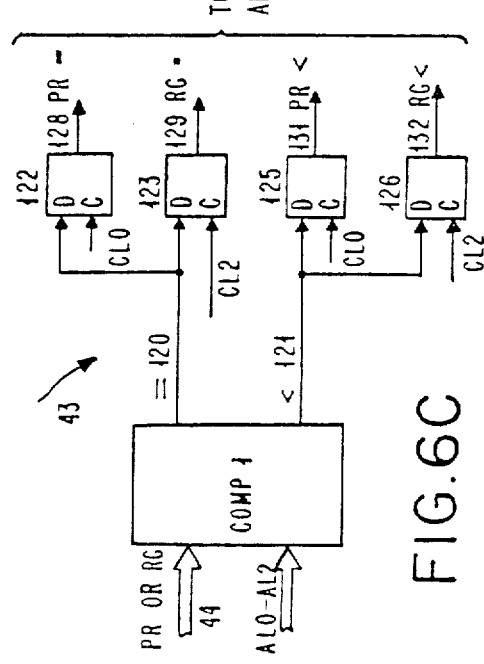

ARBITRATION METHOD AND DEVICE FOR ALLOCATING A SHARED RESOURCE IN A DATA PROCESSING SYSTEM

DESCRIPTION

1. Technical Field

This invention relates to an arbitration method and device for allocating a shared resource to a selected unit in a data processing system. More particularly, the invention relates to an arbitration method and device that can be used in a multiple processor system in which several units (such as processors, storages, input/output adapters) are connected to a common bus, and enables any one of the units to gain access to the bus.

2. Background Art

Many arbitration arrangements have been proposed heretofore to give access to a common resource, such as a bus or a storage, to one of a number of conpeting units. For example, U.S. Pat. No. 4,320,467 and PCT Patent Application WO No. 82/02440 describe an arbitration apparatus for determining which of a plurality of devices requesting access to a common bus will gain access thereto. To this end, the criterion used to select one of the competing devices is its priority level. Each device has a fixed priority level and when several devices are requesting access to the bus, the arbitration mechanism selects the one having the highest priority. Another prior art approach is the one described, for example, in U.S. Pat. No. 4,313,161 in which access to the common resource, such as a storage, is given to a unit selected by means of a centralized Select Ring, taking into account the unit last serviced and the rank of the unit. To achieve a faster selection, the units not requesting access to the resource or having low-priority requests are ignored by the Select Ring. A similar device is described in the IBM Technical Disclosure Bulletin, Vol. 23, No. 5, October 1980, pages 1801-1804. A major disadvantage of these prior art arrangements is that the arbitration process is solely based upon the priority level or the rank of the units.

Consequently, they may not be used in the context of a multiple processor system wherein all processors must have an equal opportunity of gaining access to a common resource such as an interconnecting bus.

SUMMARY OF THE INVENTION

It is an object of this invention to provide an arbitration device that uses a dynamic arbitration method of giving a selected unit access to a resource shared by a plurality of units, and that is simple and gives each unit an equal opportunity of having a request for access to said resource serviced.

The invention relates to a method and device of arbitration for a data processing system in which N units share a common resource, for allocating, during a given arbitration cycle, said resource to one of several units desiring access thereto and whose request for access will be serviced during the next cycle, if the resource is then available.

An initial age value is assigned to each unit, with each age value corresponding to the age of the request that will be made by the unit. Priority levels may or may not be assigned to the requests. The request selected during an arbitration cycle is the oldest one of all requests or of all requests having the highest priority level if a priority level has been assigned to the requests. The age value is updated when a request has been selected and the shared resource is found to be available. The age of the selected request assumes a value corresponding to that of the most recent request; the ages of the other requests are either increased by a given quantity if they correspond to requests more recent than the one selected, or left unchanged if they correspond to requests older than the one selected.

An arbitration device in accordance with a preferred embodiment of the invention includes an arbitration circuit associated with each unit, said circuit comprising an age register which is loaded with an initial age value corresponding to the physical address (0 to N − 1) of the associated unit, which address is encoded by means of a "group value" and a "rank value". The group value is selected from p distinct values and, for each group value, the rank value is selected from q values, with $p \times q = N$.

The selection of a request involves the steps of:

(1) determining which requests have the highest priority level;

(2) determining which of such requests have the highest group value; and (3) determining which one of the latter requests has the highest rank value and will be serviced during the next cycle if the resource is available.

These and other objects, features and advantages of the invention will be apparent form the following more particular description of the preferred embodiments of the invention as illustrated in the drawings.

BRIEF DESCRIPTION OF THE DRAWINGS

FIGS. 6A-6D show the selection circuits 32, 33 and the comparison circuits 43, 50 of FIG. 4.

DETAILED DESCRIPTION OF THE INVENTION

The method of the present invention can be used in a system comprising a plurality of units, all of which can be master units, for dynamically allocating a shared resource to one of several units requesting access thereto. In an embodiment to be described later, the shared resource is the bus that interconnects all units.

In such a system, each unit desiring to access the bus to perform some operation makes a request for access thereto. These requests have different priority levels depending on the type of operation to be performed; for example, real time operations have the highest priority level.

To select a request from any unit, two arbitration criteria are used, namely, the priority level of the request and the "age" of the request. At a given instant, the oldest one of the highest priority requests will be selected.

The arbitration process is carried out during each bus access cycle and does not depend upon the type of operation being performed on the bus. The process takes place while the addresses and the data are being transferred and, consequently, does not affect throughput.

An entire cycle is necessary to determine which requesting unit should gain access ot the bus during the next cycle. However, actual allocation of the bus to the unit so selected will depend on whether the operation being performed by the unit that accessed the bus during the current cycle is completed by the end of this cycle. If the operation is not completed during the current cycle, the selection does not become effective and all requests, including the old requests and the new ones, will be processed during the next cycle.

The arbitration process takes into account the various priority levels assigned to the requests for access to the bus.

When several requests have the highest priority level, only one of the units seeking access to the bus will be selected by the arbitration process. To this end, only one value, the age of the request, is used to select the unit that made the oldest request.

Assuming that N units are attached to the bus, the ages of the requests will range from 0 to $N-1$. As the system is reset, the age the request made by each unit is set to a predetermined initial value and will subsequently be updated.

Once all requests having the same priority level have been determined, the units making these requests place the corresponding age values on an arbitration bus and one of the requests is selected in accordance with the following algorithm.

The algorithm gives each of the units whose requests for access to the bus have a given priority level an equal opportunity of having its request serviced. Requests are processed on a first come, first served basis. Also, those units that made no request for access to the bus still have the opportunity of having a subsequent request granted. This means that a unit that used the bus more recently.

Figure 1:
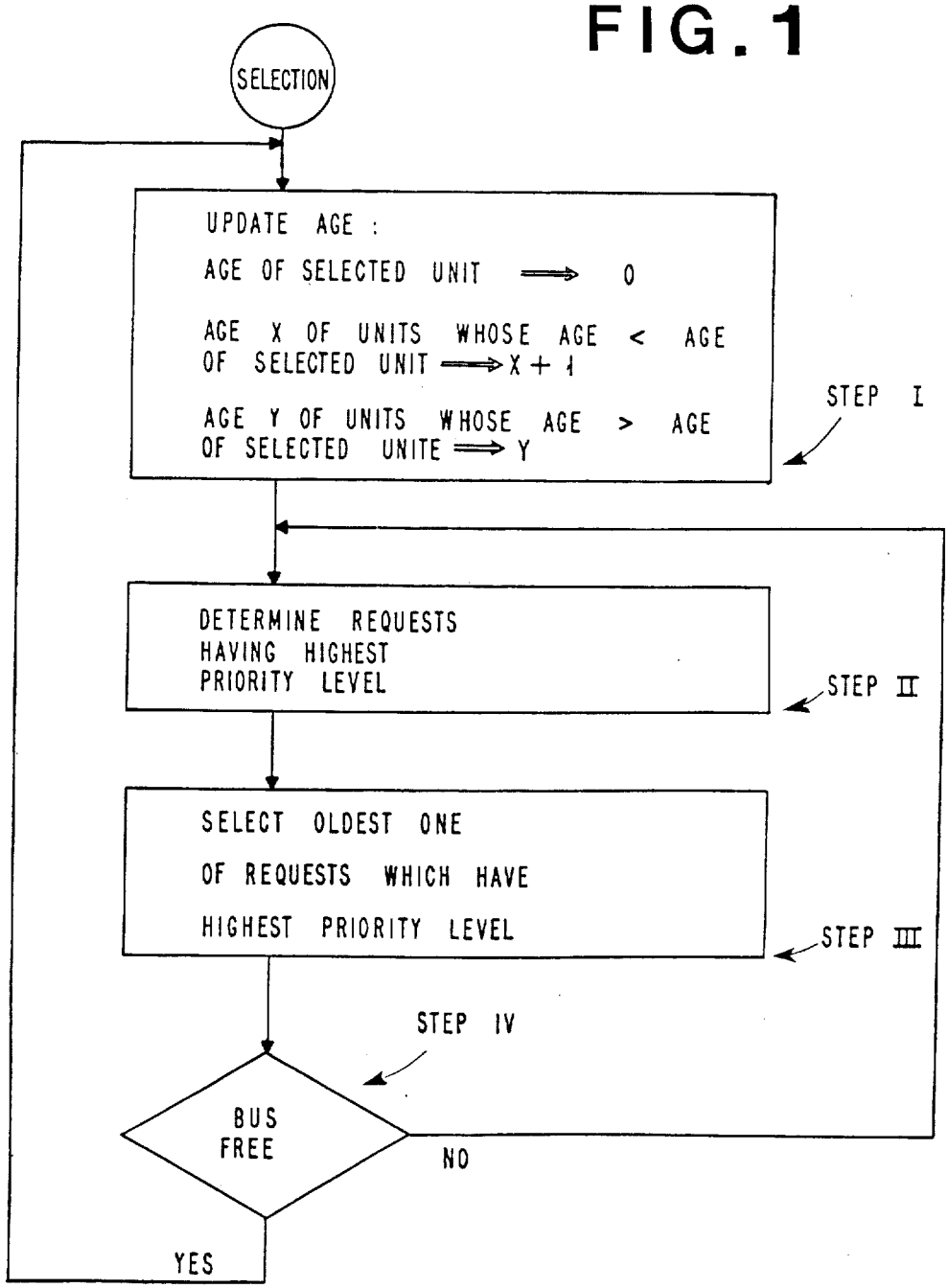
FIG. 1 is a flow chart showing the various steps of the method of the present invention.

The steps of the arbitration process are described below with reference to FIG. 1.

In step I, each unit, whether or not it is requesting access to the bus, updates its age value, provided a selected unit gained access to the bus during the preceding cycle. This means that unit which accessed the bus during the preceding cycle has now freed it and that, during that cycle, one of the units requesting access to the bus was selected and will gain access thereto during the current cycle.

The age values are updated in accordance with the following rules:

the age value of the selected unit becomes 0;

the other units increment their age values by 1, only if their age values are less than the age value of the selected unit;

if such is not the case, their age values remain unchanged.

For example, assuming that three units with respective age values of 2, 3 and 4 are requesting access to the bus while four other units with respective age values of 0, 1, 5 and 6 are not, then the unit whose age value is 4 will be selected and the other units will change their age values from 0, 1, 2, 3, 5 and 6 to 1, 2, 3, 4, 5 and 6, respectively, with the age value of the selected unit becoming 0.

In step II, all requests having the highest priority level are determined. In step III, the particular one of the highest priority requests that has the highest age value is selected.

In step IV, a test is made to determine whether the bus is available. If it is, a new cycle is entered and steps I through IV are repeated. If the bus is not available, the next cycle is entered and steps II through IV are repeated.

Figure 2:
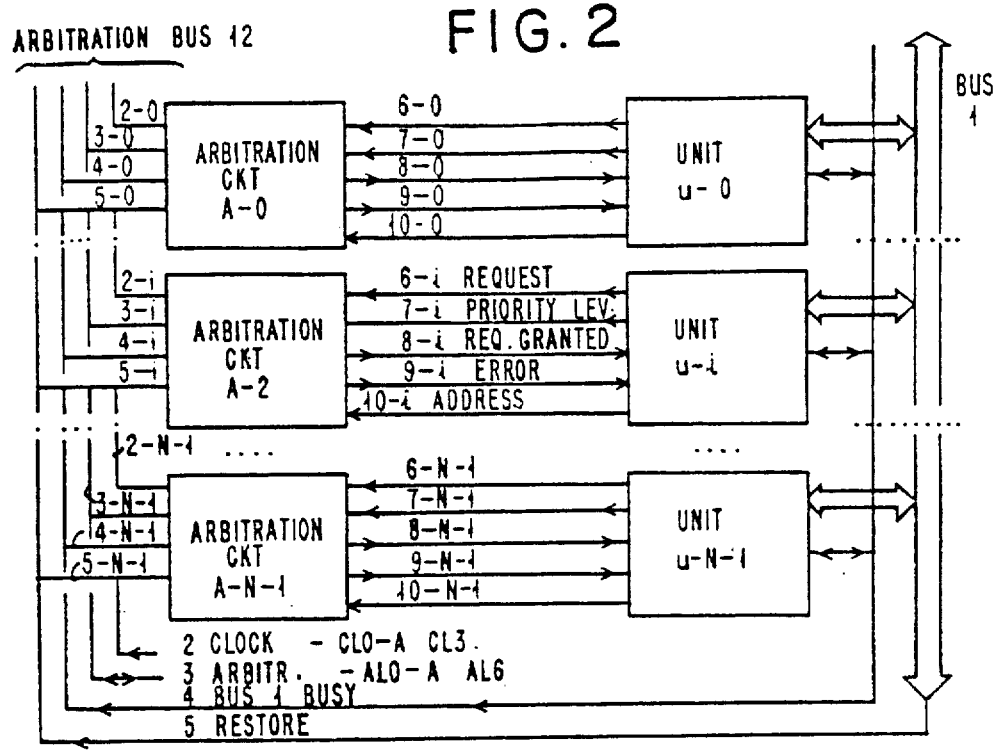
FIG. 2 is a schematic view of a system in which the method of the present invention is used.

The manner in which the arbitration method of the present invention is used in a system of the type schematically shown in FIG. 2 will now be described.

The N units, U-0 to U-N-1 (which may be storages or input/output adapters), may gain access to a bus 1 over which they may communicate with each other or access a shared resource such as a storage.

In what follows, the term "conductor" shall be used to designate the components of a bus and the term "line" shall refer to any connection not forming part of a bus.

Arbitration circuits A-0 to A-N-1 are respectively associated with units U-0 to U-N-1 and are connected to an arbitration bus 12. In a preferred embodiment, four unidirectional conductors 2 are used for distributing clock pulses CL0-CL3 (FIG. 3) to the arbitration circuits to control the successive operations required to carry out the arbitration process in a manner to be described later.

A line 4 receives from units U-0 to U-N-1 a Bus 1 Busy signal that indicates the condition of bus 1.

A line 5 is used to apply a resetting signal to circuits A-0 TO A-N-1. The lines connecting any arbitration circuit A-i to bus 12 are designated by the numerals 2 to 5 followed by the suffix i assigned to the circuit concerned. Each of units U-0 to U-N-1 is connected to the associated arbitration circuit A-0 to A-N-1 by three lines 6, 8, 9 and two buses 7, 10, as follows:

Line 6-i, labeled "Request", serves to transmit to the arbitration circuit the requests for access to the bus. A high Request signal means that the unit is requesting access to the bus.

Bus 7-i, labeled "Priority Level", is used to provide the arbitration circuit with the three bits defining the priority level, thus: 001=level 1, 010=level 2, and 100=level 3. A code such as the "one out of N" code is used to encode these bits.

Line 8-i, labeled "Request Granted", enables the arbitration circuit to inform the unit that its request has been selected.

Line 9-i, labeled "Error", is active when an error in the arbitration process has been detected and is used to inform the unit accordingly.

Bus 10-i, labeled "Address", enables each unit to send the bits of its physical address to the arbitration circuit.

Seven bidirectional conductors 3 receive from circuits A-0 to A-N-1, at appropriate times, information bits representing the arbitration parameters, namely, the priority level and the age of the request as well as a control information. This number of conductors makes it possible, in a preferred embodiment of the invention, to use the present arbitration device in conjunction with sixteen units whose requests for access to the bus can have three distinct priority levels, and may be modified to meet the requirements of another system configuration comprising more or fewer units.

Figure 3:
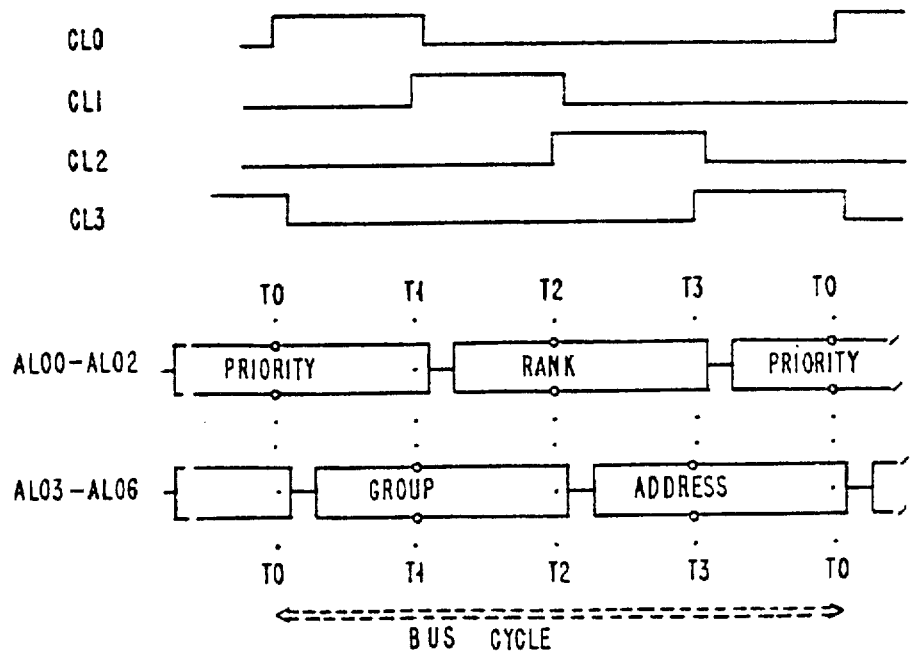
FIG. 3 is a timing diagram for explaining the operations performed during an arbitration cycle.

A bus access cycle is divided into four time intervals defined by clock pulses CL0-CL3, as illustrated in FIG. 3.

To minimize the number of conductors in the arbitration bus, the age criterion is defined by means of two values, namely, a so-called "group value" selected from p values, with p=4 in this example, and a so-called "rank value" selected, for each group, from q values, with q=4; p and q are such that $p \times q \geq N$. These two values are encoded as follows:

| AGE RANK | GROUP | RANK | ENCODED GROUP | ENCODED |
|---|---|---|---|---|
| 0 | GROUP 0 | RANK 0 | 0 0 0 0 | 0 0 0 |
| 1 | GROUP 0 | RANK 1 | 0 0 0 0 | 0 0 1 |
| 2 | GROUP 0 | RANK 2 | 0 0 0 0 | 0 1 0 |
| 3 | GROUP 0 | RANK 3 | 0 0 0 0 | 1 0 0 |
| 4 | GROUP 1 | RANK 0 | 0 0 0 1 | 0 0 0 |
| 5 | GROUP 1 | RANK 1 | 0 0 0 1 | 0 0 1 |
| 6 | GROUP 1 | RANK 2 | 0 0 0 1 | 0 1 0 |
| 7 | GROUP 1 | RANK 3 | 0 0 0 1 | 1 0 0 |
| 8 | GROUP 2 | RANK 0 | 0 0 1 0 | 0 0 0 |
| 9 | GROUP 2 | RANK 1 | 0 0 1 0 | 0 0 1 |
| 10 | GROUP 2 | RANK 2 | 0 0 1 0 | 0 1 0 |
| 11 | GROUP 2 | RANK 3 | 0 0 1 0 | 1 0 0 |
| 12 | GROUP 3 | RANK 0 | 0 1 0 0 | 0 0 0 |
| 13 | GROUP 3 | RANK 1 | 0 1 0 0 | 0 0 1 |
| 14 | GROUP 3 | RANK 2 | 0 1 0 0 | 0 1 0 |
| 15 | GROUP 3 | RANK 3 | 0 1 0 0 | 1 0 0 |

Conductors AL0-AL6 in the arbitration bus are divided into a couple of sub-sets, G1 and G2. G1 is comprised of conductors AL0-AL2 which receive at appropriate times, as shown in FIG. 3, the bits representing the priority level or the rank value. G2 is comprised of conductors AL3-AL6 which receive at appropriate times, as shown in FIG. 3, the bits representing the group value or the address.

The sequence of operations required to select a request for access to the bus is as follows and necessitates an entire bus cycle. Such a cycle extends between two successive times TO, each of which is defined by an up-going transistion of CL0. An arbitration cycle extends between two successive times T3, each of which is defined by an up-going transistion of CL3.

At time T0, the bits defining the priority levels (placed on conductors AL0-AL2 at time T3 during the preceding cycle) are compared in the associated arbitration circuits with the bits of the highest priority level present on the arbitration bus. The logical sum of the bits of the various priority levels is made on the arbitration bus and, in view of the type of code (1 out of N) employed, the resulting combination of bits represents the highest priority level. If the priority level of the request made by any unit is thus found to be the highest level, then the associated arbitration circuit places on conductors AL3-AL6 the bits defining the group value of the request. In addition, all units, whether or not they are requesting access to the bus, test a latch in which the condition of bus 1 had been stored during the preceding cycle. If it is thus determined that the bus was free, then the group value and the rank value are updated in accordance with the algorithm described earlier. Alternately, no changes are made because, if the bus was not free, the current operation was not completed and, therefore, a new arbitration cycle must begin.

At time T1, the bits defining the group values of the requests made by the units that are still competing after the comparison of the priority levels are present on conductors AL3-AL6 and, as in the case of the priority levels, each arbitration circuit compares the group value of the request made by the associated unit with the highest group value on these conductors. Whenever the group value of a request is thus found to be equal to the highest group value, the arbitration circuit concerned substitutes the rank value of the request for the priority level on conductors AL0-AL2. Simultaneously, the arbitration circuits eliminate the bits of the priority levels of the other units on conductors AL0-AL2 so that they will not interfere with the subsequent comparison of the bits defining the rank values.

At time T2, the bits of the rank values thus placed on conductors AL0-AL2 are compared by the arbitration circuits, as was done in the case of the priority levels and the group values, with the highest rank value present on these conductors. Normally, only one request should remain active after this comparison. However, a fourth step is performed for checking purposes.

To this end, the units that are still competing (assuming that there are several) place the bits defining their physical addresses on conductors AL3-AL6. Simultaneously, all other units eliminate the bits defining their group values on conductors AL3-AL6.

At time T3, the physical address on conductors AL3-AL6 is read by those arbitration circuits which had detected rank values equal to the highest rank value, and this address is now compared with the physical addresses of the units still competing. Since the bit values defining any of these addresses will be altered by those of the other addresses, all arbitration circuits but one will detect an error condition and send an error signal over their respective lines 9-i.

Thus, only one request will be selected upon completion of the arbitration cycle. All arbitration circuits then test the condition of line 4 ("Bus 1 Busy") to determine whether the bus is available. The condition of the bus is stored in a latch as it will be used at the next occurrence of time T0 to update the age values. If the test indicates that the bus is available, this means that a single request from unit U-i has been selected, arbitration circuit A-i raises line 8-i ("Request Granted"), and the unit will gain access to the bus at the next occurrence of time T0.

If the test indicates that the bus is busy, no request is selected and the arbitration process will start again during the next cycle. Therefore, whether or not the bus is available, all arbitration circuits which had placed bits defining rank values on conductors AL0-AL2 now eliminate them and all units which at this time have outstanding requests for access to the bus (line 6 and bus 7 being raised) place the bits of the priority level on conductors AL0-AL2. A new arbitration cycle can start.

The arbitration cycle is initiated by the occurrence on line 5 of a Reset command which causes the initial age values corresponding to the physical addresses of the units to be loaded. However, no request will be selected during the arbitration cycle since the bits defining the priority levels are not present on conductors AL0-AL2. The arbitration cycle will start at the next occurrence of time T0. The timing of the various operations is shown in FIG. 3 as well as clock pulses CL0 and CL3. The information concerning the priority levels and the rank and group values that are placed on conductors AL0-AL6 is shown for each period.

Figure 4:
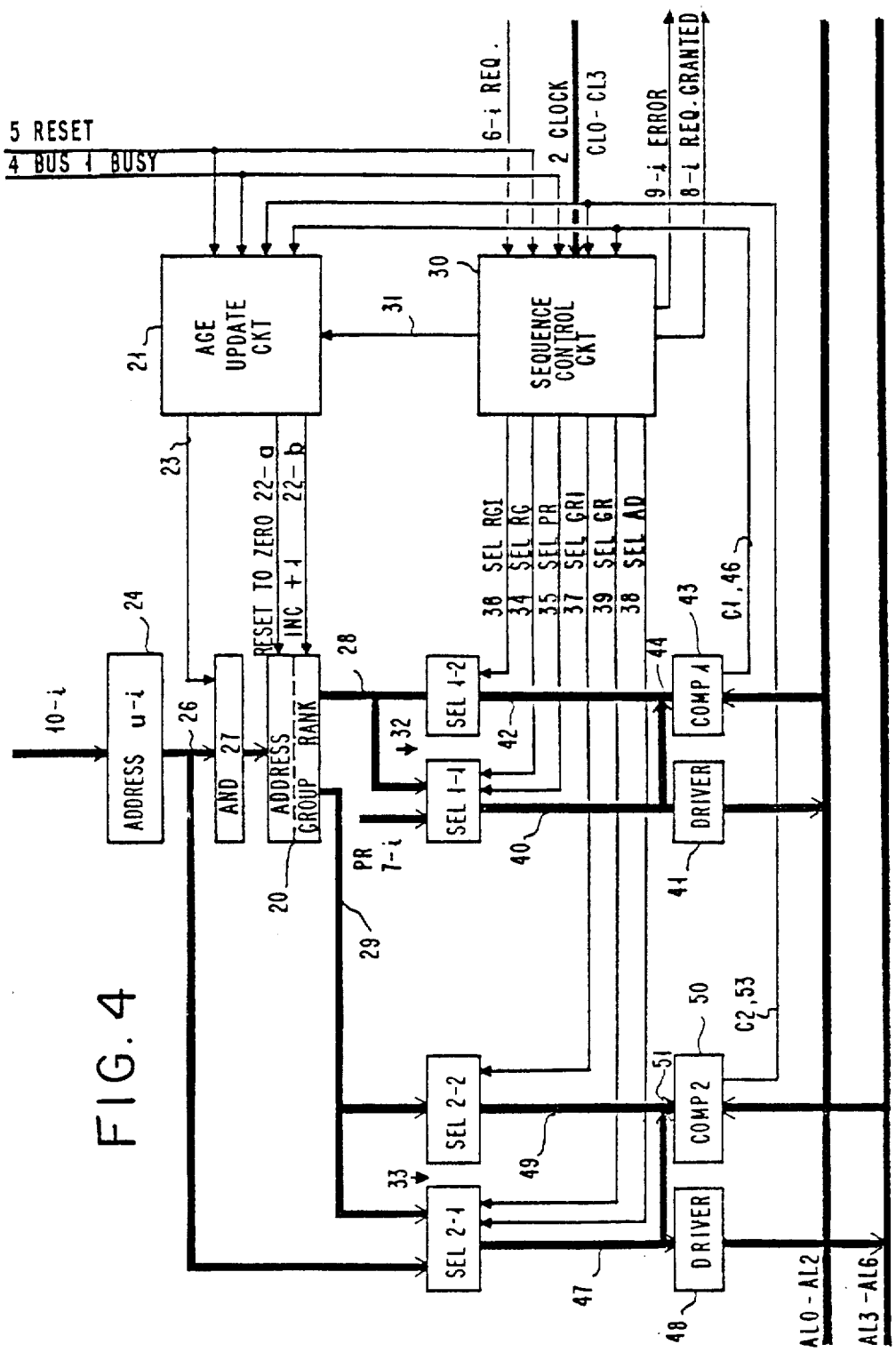
FIG. 4 shows an arbitration circuit A-i associated with a unit U-i.

Each arbitration circuit such as A-i comprises the elements illustrated in FIG. 4. An age register 20 is initially loaded, when the system is reset, with the bits of the physical address and stores the bits of the group and rank values in accordance with the above Table, as initial age value. The loading of the physical address and the updating of the age value are performed under control of an age control circuit 21 which generates two outputs on lines 22a and 22b labeled "Reset to Zero" and "INC+1", respectively.

The first output signal on line 22a resets the age value to zero when the request is accepted, and the second output signal on line 22b causes the age value to be incremented in accordance with the algorithm described earlier. Circuit 21 generates on output line 23 an initial loading signal. Initially, the register is loaded with the physical address of the unit U-i associated with circuit A-i. To this end, the address is stored in an address register 24 which is loaded by the Address bus 10-i. The contents of register 24 can be transferred to age register 20 via bus 26 under control of the physical address loading signal on line 23. The bits defining the rank and group values are provided by register 20 on its output buses 28 and 29 to be used during the selection process. A sequence control circuit 30 to be described with reference to FIGS. 6A and 6B receives from the arbitration bus clock signals CL0-CL3 via conductors 2, the Bus 1 Busy signal via conductor 4 and the Reset signal via conductor 5, and, from unit U-i, the Request signal via line 6-i. Circuit 30 generates control signals as a function of the incoming signals to enable the arbitration process to take place and generates on its output line 31 the control signal for updating the age value and on its output lines 9-i and 8-i connected to unit U-i the Error and Request Granted signals, respectively.

The arbitration circuit futher includes a first selector 32 consisting of two selection circuits, SEL 1—1 and SEL 1-2, and a second selector 33 consisting of two selection circuits, SEL 2-1 and SEL 2—2. Selectors 32, 33 receive from circuit 30 selection signals via lines 34-39. Circuit SEL 1—1 of selector 32 places on its output bus 40, at appropriate times defined by the SEL RG and SEL PR signals respectively present on lines 34 and 35, either the bits defining the rank value that are received over bus 28 or those defining the priority level that are received over bus 7-i.

Drivers 41 in an open collector configuration are connected to bus 40 and place the contents thereof on conductors AL0-AL2 of the arbitration bus 12.

Circuit SEL 1-2 of selector 32 applies to bus 42 the bits of the rank value received via bus 28 under control of the SEL RGI signal on line 36. This signal is high from time T1 to time T3.

Comparator 43 compares the bits on input conductors AL0-AL2 with those on input bus 44. The latter bits are either the bits received from bus 40 that define the rank values or the priority levels, or the bits received from bus 42 and defining the rank values.

Comparator 43 provides on its output line 46 two signals designated C1 the first of which denotes an equality between the respective states of the bits on bus 44 and on conductors AL0-AL2, and the second of which indicates that the states of the bits on bus 44 correspond to a value smaller than that represented by the states of the bits on conductors AL0-AL2.

Circuit SEL 2-1 of selector 33 places on its output bus 47, at appropriate times defined by the SEL AD and SEL GR signals respectively present on lines 38 and 39, either the address bits present on bus 26 or those defining the group value on bus 29. Drivers 48 in an open collector configuration are connected to bus 47 and apply the bits defining the address or the group value to conductors AL3-AL6 when circuit SEL 2-1 is open.

Circuit SEL 2—2 of selector 33 provides on its output bus 49 the bits defining the group value as received over bus 29 under control of the SEL GRI signal on line 37.

Comparator 50 receives, on the one hand, the bits present on conductors AL3-AL6 and, on the other hand, those present on input bus 51 which are either the bits from bus 47 that define the address or the group value, or the bits from bus 49 that define the group value.

Comparator 50 provides on its output line 53 two signals designated C2. One of these denotes an equality between the respective states of the bits on bus 51 and on conductors AL3-AL6. The second C2 signal indicates that the bits on bus 51 correspond to a value smaller than that represented by the bits on conductors AL3-AL6.

The sequence control circuit enables the following sequence of operations, as shown in FIGS. 5A-5D, to be performed during each cycle.

The arbitration process can start either upon receipt of a Reset signal or subsequent to an arbitration operation performed during a previous cycle.

Upon recipt of a Reset signal on line 5, the age value is loaded in register 20 from register 24 (this step is shown as block 60), then the system waits for clock signal CL0 to go up (block 61).

When CL0 goes up, a Bus Accessed signal (FIG. 7, latch 208) generated during the preceding arbitration cycle goes down. The SEL AD signal on line 38 goes down to eliminate the address on output bus 47 of selector 33 and, therefore, on conductors AL3-AL6, and the arbitration parameters are updated (block 62).

A test is made (block 63) to determine the condition of Request line 6-i. If the line is down, no request has been made and the system waits for signal CL1 to go up (block 66).

If a Request signal is present on the line, comparator COMP1 43 compares the value of the bits on conductors AL0-AL2, which represents the OR function of all priority level bits on the arbitration bus and, therefore, the highest priority as a result of the use of the "1 out of N" code, with the value of the priority level bits of the request on bus 40 (block 64).

If C1 indicates an inequality (value of bits on bus 40_ value of bits on AL0-AL2), the Request latch (200 in FIG. 7) is reset (block 65) and the system waits for CL1 to go up (block 66).

If C1 indicates an equality, then the SEL GR signal on line 39 enables selector 2-1 33 to transfer the group value bits to cause all arbitration circuits still competing to place their group value bits on conductors AL3-AL6 (block 67).

The SEL GRI signal is high to cause the group value bits to be transferred to bus 51 regardless of the result of the comparison.

When CL1 goes up (FIG. 5B), the SEL PR signal on line 35 goes down to inhibit selector SEL 1—1 32 so as to eliminate the priority bits on bus 40 and, therefore, on conductors AL0-AL2 (block 70). A test is made to determine the condition of the Request latch (block 71). If no Request signal is present, the value of the group bits on conductors AL3-AL6 and that of the group bits on the conductors of bus 49 are compared in comparator COMP2 50 (block 72) in the same manner as the priority bits, with the bits on conductors AL3-AL6 representing the highest group value. The system then waits for CL2 to go up (block 73).

If a Request signal is present, the group bits on bus 51 and those on conductors AL3–AL6 are compared in the same manner as before.

If the value of the bits on bus 51 is less than that of the bits on conductors AL3–AL6, then the Request latch is reset (block 75) and the system waits for CL2 to go up.

If an inequality is detected, the rank value bits are placed on bus 40 by selector SEL 1—1 32, rendered conductive by the SEL RG signal present on line 34, and are then placed on conductors AL0–AL2 by drivers 41 (block 76). The system then waits for signal CL2 to go up (block 73).

The SEL RGI signal on line 35 goes up to render selector SEL 1-2 32 conductive and cause the rank value bits to be transferred to bus 42 and applied to input bus 44 of comparator 43, regardless of whether or not a request was made. The system then waits for CL2 to go up (block 73).

When CL2 goes up (FIG. 5C), the SEL GRI signal on line 37 goes pow to inhibit selector SEL 2—2 33, so as to eliminate the group value bits on conductors AL-3–AL6 (block 80). A test is made to determine the condition of the Request latch (block 81).

If no Request signal is present, the rank value bits on conductors AL0–AL2 are compared with those on bus 42 by comparator COMP1 43 (block 82). The rank value bits on AL0–AL2 represent the OR function of the rank value bits of all requests made by the still competing units and, therefore, indicate the highest rank value. The system then waits for CL3 to go up (block 83).

If a Request signal is present, the rank value bits on bus 44 are compared with those on conductors AL-0–AL2 in comparator 43 in the manner previously described.

If an inequality is detected (value of bits on bus 44 > value of bits on AL0–AL2), the Request latch is reset (block 85) and the system waits for CL3 to go up (block 83).

If an equality is detected, the SEL AD signal on line 38 renders selector 2-1 33 conductive to transfer the contents of bus 26 to bus 47 and place the address bits on conductors AL3–AL6, and the Bus Accessed latch is set to "1" (block 86). The system then waits for CL3 to go up (block 83).

When CL3 goes up (FIG. 5D), the SEL RGI signal on line 35 goes down and selector SEL 1-2 32 is inhibited to elimate these rank value bits on bus 42.

Figure 7:
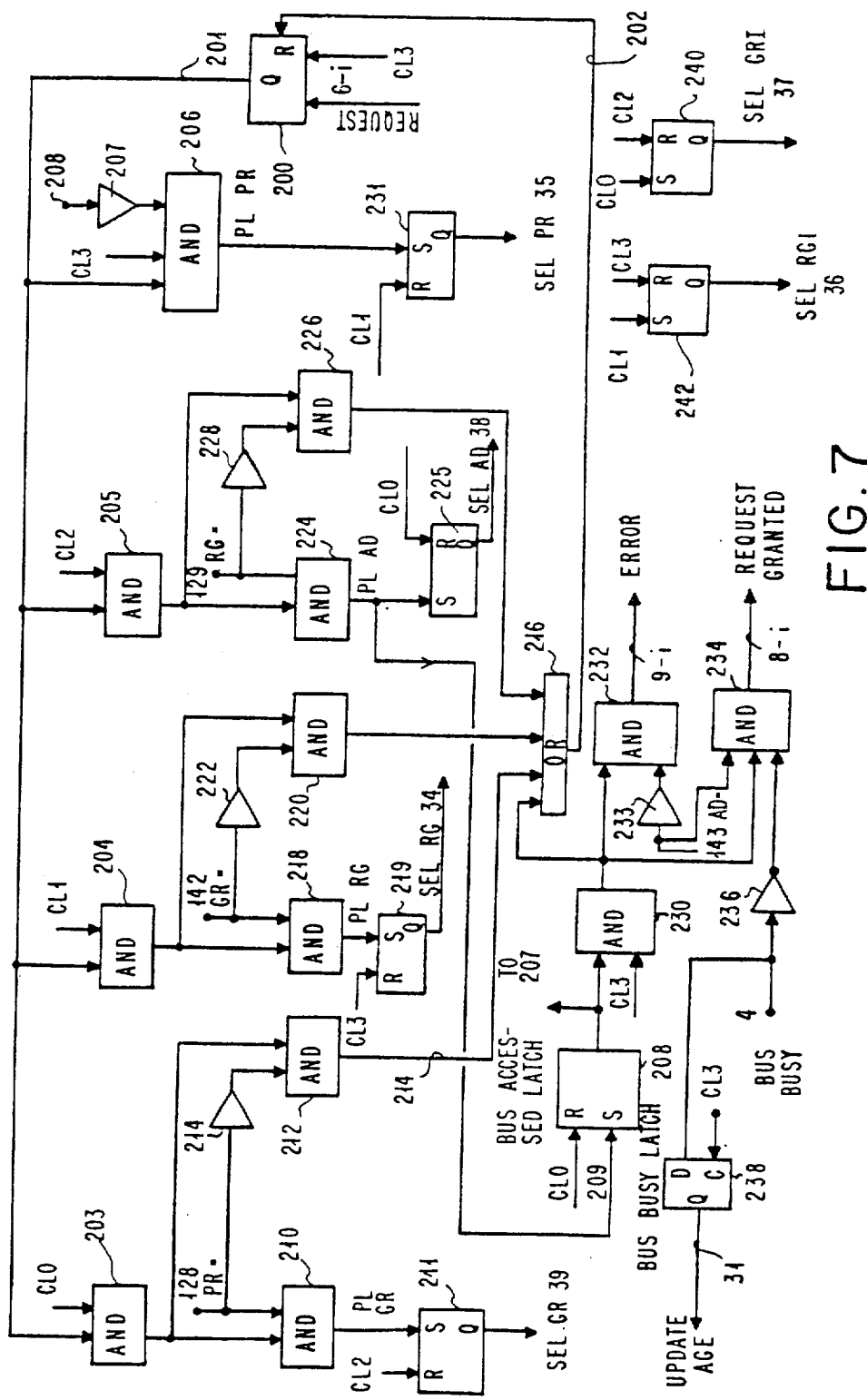
FIG. 7 is a schematic diagram of the sequence control circuit 30 of FIG. 4.

The condition of Bus 1 Busy line 4 is stored in a Bus Busy latch (238, FIG. 7). The condition of Request line 6-i is stored in a Request Bus latch (200, FIG. 7). The rank value bits are eliminated on conductors AL0–AL2 by causing the SEL RG signal on line 34 to go down, thereby inhibiting selector SEL 1—1 32 (block 90).

A test is performed (block 91) to determine the condition of the Bus Accessed latch (208, FIG. 7).

If this latch is reset, thereby indicating that the bus has not been accessed, the Request latch is tested (block 92). If no request has been made, the system waits for signal CL0 to go up (block 61, FIG. 5A). If a request has been made, the priority level bits are placed on conductors AL0–AL2 by selector SEL 1—1, rendered conductive by the SEL PR signal on line 35 (block 93), and the system waits for signal CL0 to go up in order that a new arbitration cycle may begin.

If the Bus Accessed latch is set to "1", the Request latch (200, FIG. 7) is reset (block 94) and the physical address is compared in comparator COMP 2 50 (block 95). If the address bits on conductors AL3–AL6 and the address of the unit associated with the arbitration circuit do not match, then (block 96) the Error line 9-i is raised, the Request Bus signal is removed, and the condition of the Error line is stored.

If an equality is detected, a test is made (block 97) to determine the condition of the Bus 1 Busy line. If the bus is busy, the system waits for CL0 to go up (block 61). If the bus is not busy, the Request Bus signal is removed, the Request Granted line is set to a condition indicating that the request has been selected (block 98), and the system waits for CL0 to go up. During the next cycle, this unit shall not participate in the selection process and its request shall be serviced.

Referring now to FIGS. 6A–6D, 7 and 8, the logic elements that are necessary for implementing the present method will be described. Selectors 32 and 33 are schematically shown in FIGS. 6A and 6B.

Circuit SEL 1—1 of selector 32 comprises AND gates 100 and 102 and OR gates 104. AND gates 100 receive as inputs the bits present on priority bus PR 7-i and the SEL PR signal present on line 35. AND gates 102 receive as inputs the rank value bits present on bus 28 and the SEL RG signal present on line 34. The outputs from AND gates 100 and 102 are applied as inputs to OR gates 104, which provide on bus 40 the priority level bits or the rank value bits, depending on which of the SEL PR and SEL RG signals is high.

Circuit SEL 1-2 of selector 32 comprises AND gates 103, which receive as inputs the rank value bits from bus 28 and the SEL RGI signal present on line 36. When this signal is high, AND gates 103 provide the rank value bits on bus 42.

Circuit SEL 2-1 of selector 33 comprises AND gates 105 and 107 and OR gates 109. AND gates 105 receive as inputs the bits present on address bus 26 and the SEL AD signal present on bus 38. AND gates 107 receive as inputs the group value bits present on bus 29 and the SEL GR signal present on line 39.

The outputs from AND gates 105 and 107 are applied as inputs to OR gates 109, which provide on bus 47 the address bits or the group value bits, depending on which of the SEL AD and SEL GR signals is high.

Circuit SEL 2—2 of selector 33 comprises AND gates 108 which receive as inputs the group value bits present on bus 29 and the SEL GRI control signal present on line 37. When this signal is high, AND gates 108 provide the group value bits on bus 49.

Comparator COMP 1 of circuit 43, as shown in FIG. 6C, receives the bits present on bus 44 and on conductors AL0–AL2, and has two output lines respectively designated "=120" and "<121". The signal on output =120 is high when the value of the bits on bus 44 is equal to that of the bits on conductors AL0–AL2, and the signal on output <121 is high when the value of the bits on bus 44 is less than that of the bits on AL0–AL2.

The results of the comparison are stored in D-type latches 122, 123, 125, 126 at appropriate times.

Latch 122 stores the result provided on output line 120 when signal CL0 goes high. A high signal on its output line, labeled "128 PR =", means that an equality has been detected between the priority level bits. Latch 123 stores the result of the comparison, as provided on line 120, when signal CL2 goes high. A high signal on the output line of latch 123, labeled "129 RG =", means that an equality has been found between the rank value bits.

Latch 125 stores the condition of line 121 when CL0 goes high. A high signal on its output line, labeled "131 PR <", means that the value of the priority level bits on bus 44 is less than that of the bits on conductors AL-0–AL2. Latch 126 stores the condition of line 121 when signal CL2 goes high. A high signal on the output line, labeled "132 RG <", of latch 126 means that the value of the rank bits on bus 44 is less than that of the bits on AL0–AL2.

Outputs 128, 129, 131 and 132 provide the C1 signal sent over line 46 (comprising 4 conductors), as shown in FIG. 4, to the sequence and age control circuits 30 and 21.

Comparator COMP 2 of circuit 50, as shown in FIG. 6D, receives as inputs the bits on bus 51 and those on conductors AL3–AL6 and provides two signals on its output lines, labeled "=134" and "<135", which have the same meanings as above.

A high signal on output =134 means that an equality exists between the input bits received by the comparator, while a high signal on output <135 means that the value of the bits on conductors AL3–AL6 is less than that of the bits on bus 51.

The condition of these outputs is stored in four D-type latches 136, 137, 139, 140. Latch 136 stores the condition of output 134 when signal CL1 goes high and a high signal on its output line, labeled "142 GR =", means that an equality has been detected between the group value bits. Latch 137 stores the condition of output 134 when CL3 goes high and a high signal on its output line, labeled 143 AD =, means that an equality has been detected between the address bits.

Latch 139 stores the condition of output 135 when signal CL1 goes high, and a high signal on its output line, labeled "145 GR <", means that an inequality has been detected between the group bits. Latch 140 stores the condition of output 135 when signal CL3 goes high and a high signal on its output line, labeled "146 AD <", means that an inequality has been detected between the address bits.

Outputs 142, 143, 145 and 146 provide the C2 signal sent over line 49 (comprising four conductors) to the sequence and age control circuits 30 and 21.

Referring now to FIG. 7, the sequence control circuit 30 is schematically depicted.

Circuit 30 comprises a D-type Request latch 200 which stores the condition of Request line 6-i when signal CL3 goes high and can be reset (low signal on output 201) by a signal applied to its Reset (R) input 202. Output 201 from Request latch 200 is applied to one input of each of four AND gates 203–206 which are activated by clock signals CL0–CL3. AND gate 206 is activated when an additional condition, Bus Accessed =0, is satisfied. Accordingly, an input of AND gate 206 is connected to the output of Bus Accessed latch 208, as inverted by inverter 207.

The output from AND gate 203 is applied to one input of an AND gate 210 which has its other input connected to output 128 PR = of latch 122 (FIG. 6C). AND gate 210 provides at its output the PL GR signal that controls the application of the group value bits onto conductors AL3–AL6. This signal is applied to the set (S) input of a latch 211 which provides at its Q output the SEL GR signal sent over line 39. This latch is reset by CL2 to eliminate the group bits on AL3–AL6 when signal CL2 goes high.

An AND gate 212 receives as one input the output from AND gate 203 and as another input the output 128 PR =, as inverted by inverter 214. AND gate 212 provides at its output 214 a signal for resetting Request latch 200.

This signal is applied to one input of an OR gate 216, the output of which is connected to the Reset input 202 of latch 200.

The output of AND gate 204 is connected to one input of an AND gate 218 the other input of which is connected to output 142 GR = of latch 136. Gate 218 provides at its output the PL RG signal which controls the application of the rank value bits onto conductors AL0–AL2. This signal is applied to the set (S) input of a latch 219 the Q output of which provides on line 34 the rank selection signal SEL RG. This latch is reset when GL3 goes high to eliminate the rank bits on AL0–AL2.

An AND gate 220 has an input connected to the output of AND gate 204 and another input connected to output 142 GR = through an inverter 222. The output of AND gate 220 is connected to an input of OR gate 216 to cause latch 200 to be reset under certain conditions.

The output of AND gate 205 is connected to one input of an AND gate 224 which has its other input connected to output 129 RG = of latch 123. AND gate 226 has one input connected to the output of AND gate 205 and another input connected to output 129 RG = through an inverter 228. AND gate 224 provides at its output the PL AD signal which controls the application of the address bits onto conductors AL3–AL6. This signal is applied to the set (S) input of a latch 225 which supplies at its output the SEL AD signal on line 38. This latch is reset when signal CL0 goes high to eliminate the address bits on AL3–AL6.

The output of AND gate 224 is also connected to the set input 209 of Bus Accessed latch 208.

The output of AND gate 226 is connected to one input of OR gate 216 to cause the Request latch to be reset under certain conditions.

The output of AND gate 206 provides the PL PR signal which controls the application of the priority level bits onto conductors AL0–AL2. This signal is applied to the set input of a latch 231 the output of which provides on line 35 the SEL PR signal. This latch is reset when signal CL1 goes high to eliminate the priority bits on AL0–AL2.

Bus Accessed latch 208 is a RS-type latch that is reset when signal CL0 is applied to its R input.

The output from latch 208 is applied to one input of an AND gate 230 that is activated by signal CL3 applied to its other input. The output from AND gate 230 is applied to one input of OR gate 216.

AND gate 232 has one input connected to the output of AND gate 230 and its other input connected to output 143 AD = of latch 140 as inverted by inverter 233 to provide the Error signal at its output 9-1.

AND gate 234 has an input connected to output 143 AD = of latch 143, another input connected to the output of gate 230 and still another input connected to the output of inverter 236, which has its input connected to Bus 1 Busy line 4. Gate 234 provides at its output 8-i the Request Granted signal which, when high, enables the unit associated with the arbitration circuit to access the bus.

When signal CL3 goes high, D-type latch 238 stores the condition of the line to provide the signal controlling the age updating function on line 31.

A latch 240, set by signal CL0 and reset by signal CL2, provides at its Q output the SEL RGI signal sent over line 37.

A latch 242, set by CL1 and reset by CL3, provides at its Q output the SEL RGI signal sent over line 36.

Figure 5A:
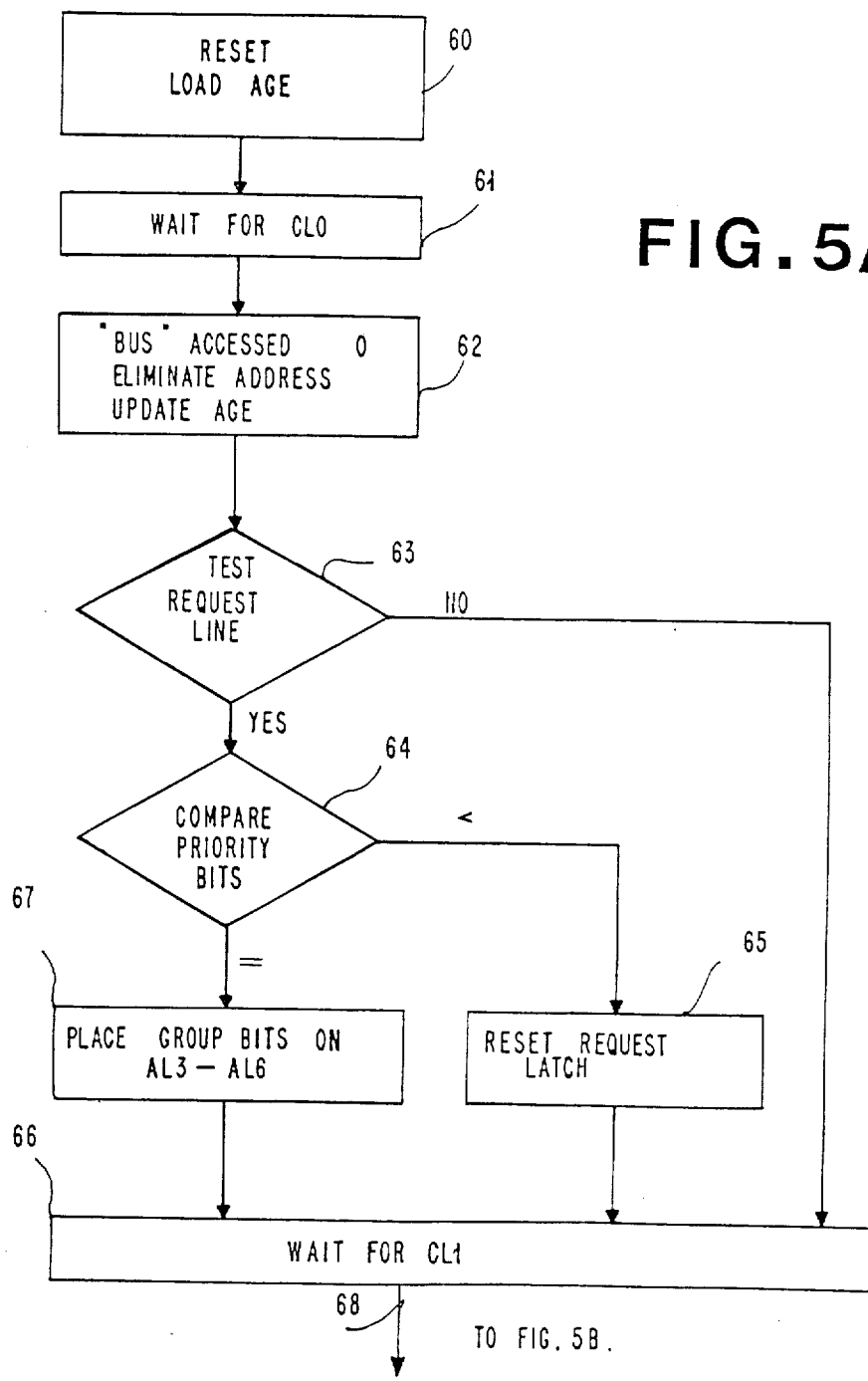
FIGS. 5A-5D are flow charts showing the operations performed in the circuit of FIG. 4 during each of the clock periods CL0-CL3.
Figure 5B:
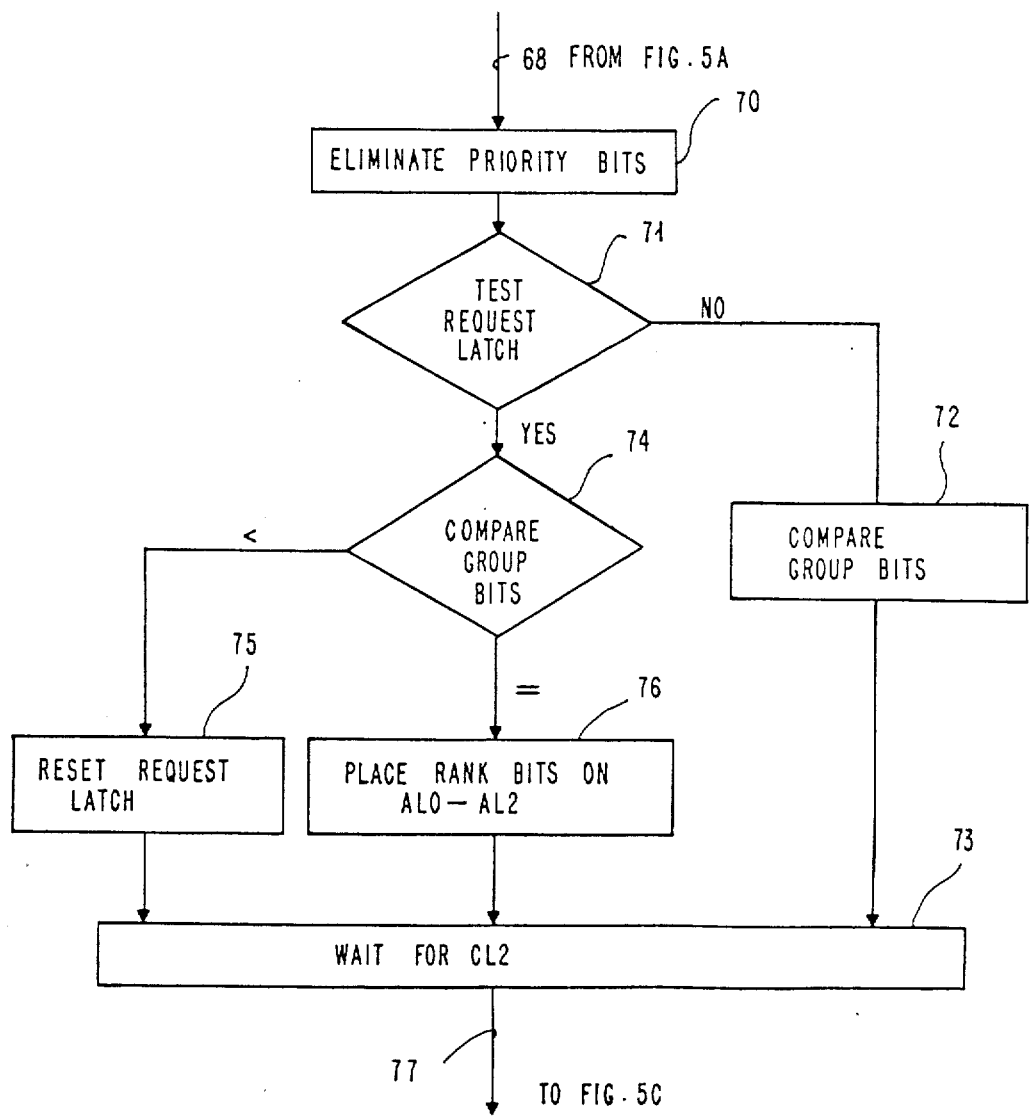
Figure 5C:
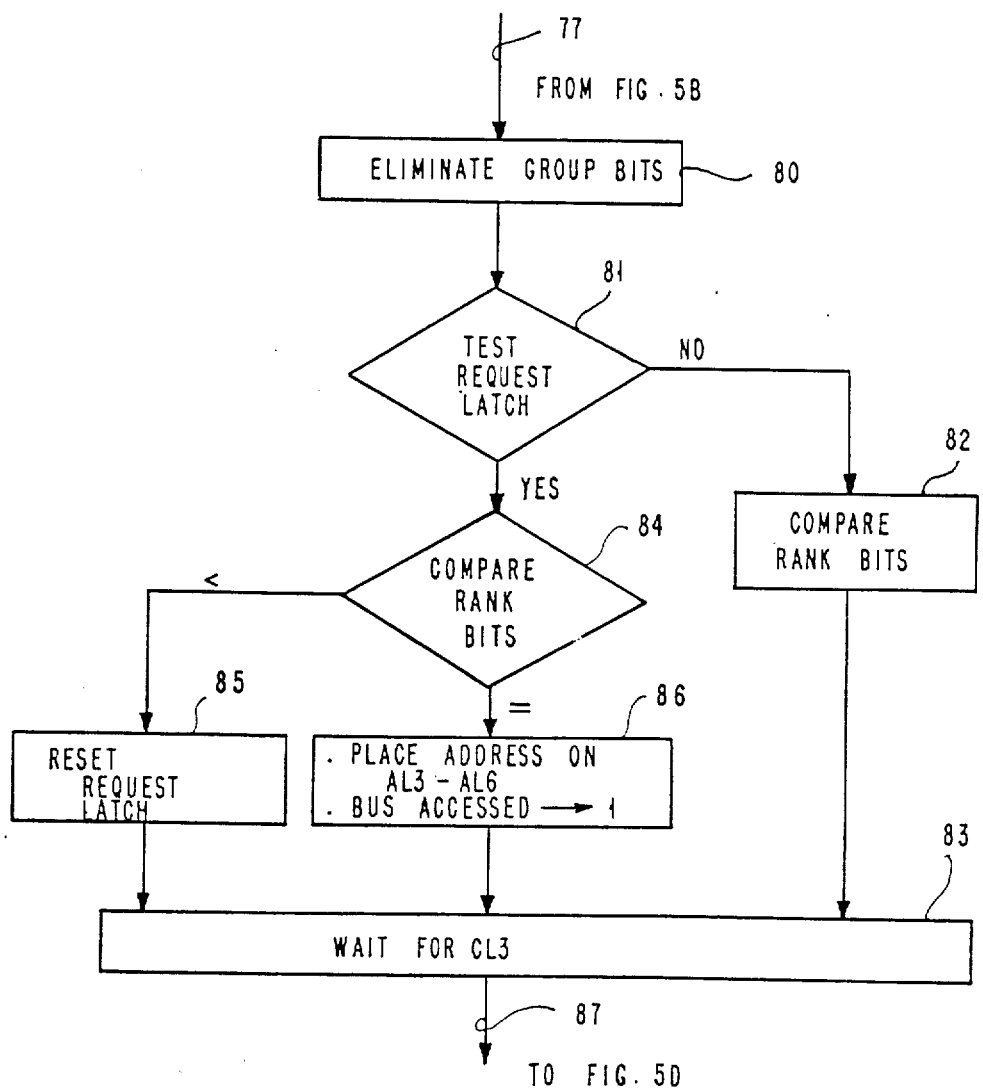
Figure 5D:
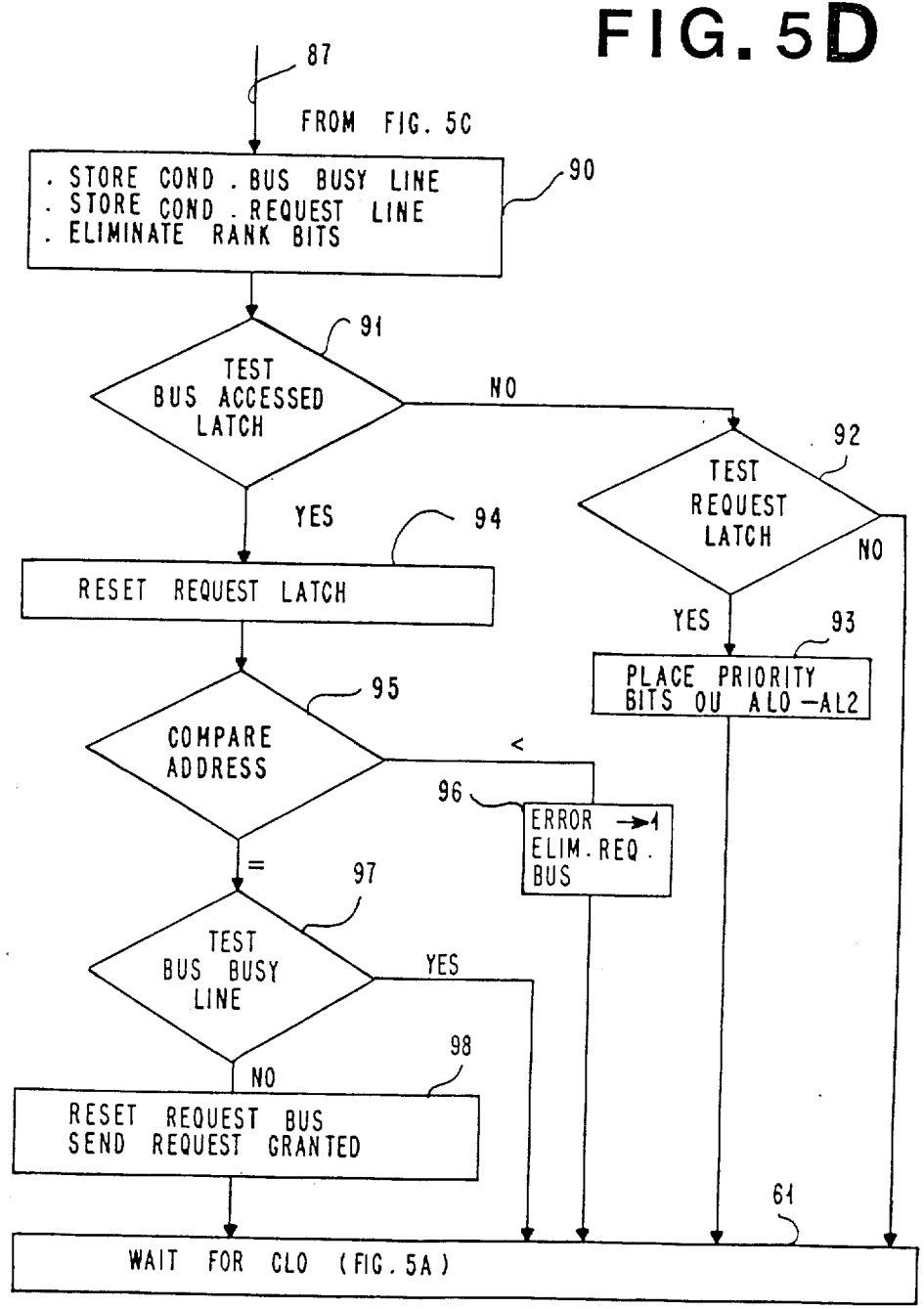

The circuit of FIG. 7 enables the operations shown in the flow chart of FIGS. 5A and 5D to be performed.

When signal CL0 goes high, AND gate 203 is open. Latch 240 is set and the SEL GRI signal goes high on line 37 and opens gates 107 (FIG. 6B), thereby transferring the group value bits to bus 49. Latch 225 is reset, the SEL AD signal on line 38 inhibits AND gates 105 (FIG. 6B), and the address bits are eliminated on conductors AL3-AL6. The Bus Accessed latch is reset.

Comparator 43 compares the priority level bits placed on bus 40 when signal CL3 went high during the preceding cycle, with those on conductors AL0-AL2. If an equality is detected, then AND gate 210 is activated. If a request for access to the bus is present on line 6-i, latch 200 is set, AND gate 210 supplies a high output signal, and the group selection signal, SEL GR, on line 39 is high. AND gates 107 (FIG. 6B) are activated and the group value bits are placed on bus 47 and on conductors AL3-AL6.

If no equality is detected, AND gate 212 provides a high output signal which is applied to the Reset input of latch 200.

When signal CL1 goes high, latch 231 is reset. The SEL PR signal on line 35 is low, thereby closing AND gates 100 and eliminating the priority bits on conductors AL0-AL2. Latch 242 is set, the SEL RGI signal on line 36 is high, thereby activating AND gates 103 and transferring the rank value bits to bus 42.

If Request latch 200 was not reset at the preceding up-going transition of signal CL0, that is, if there was an equality between the priority level bits, then AND gate 204 provides a high output signal.

The group bits are compared in comparator COMP 250 in all arbitration circuits.

If an equality is detected, a high SEL RG output signal is obtained on line 34 to transfer the rank value bits to conductors AL0—AL0, AND gates 102 (FIG. 6A) being open.

If no equality is detected, AND gate 220 provides a high output signal to reset Request latch 200.

If the Request latch had been reset at the preceding up-going transistion of signal CL0, AND gate 204 would have been inhibited and the rank selection signal, SEL RG, would be low. AND gates 102 (FIG. 6A) would be inhibited. Accordingly, the rank value bits in these arbitration circuits are not applied to conductors AL0-AL2.

When signal CL2 goes high, latch 240 is reset and the SEL GRI signal on line 37 inhibits AND gates 103. The group value bits are eliminated on conductors AL-3-AL6 since AND gates 107 are inhibited, this being due to the fact that latch 211 is reset and the SEL GR signal on line 39 is low.

The rank value bits are compared by comparator COMP 43, which receives as inputs the rank value bits present on bus 44 and the bits defining the highest rank value on AL0-AL2.

If an equality is detected and if latch 200 was not reset at the preceding up-going transition of signal CL1, AND gate 205 is open and AND gate 224 supplies a high output signal to set latch 225 and cause the SEL AD signal to go high, thereby activating AND gates 105. The address bits are transferred from bus 47 and drivers 48 to conductors AL3-AL6.

The output signal of AND gate 224 sets Bus Accessed latch 208.

If no equality is detected and if latch 200 was not reset at the preceding up-going transition of signal CL1, AND gate 205 is open and AND gate 226 provides a high output signal to reset Request latch 200.

If the Request latch had been reset, AND gates 205 and 224 would be inhibited, the SEL AD signal on line 38 would be low, the address bits of this unit would not be placed on the bus, and the Bus Accessed latch would not be set.

When signal CL3 goes high, latch 242 is reset and the SEL RGI signal on line 36 is low, thereby inhibiting AND gates 103. Latch 219 is reset and the SEL RG signal on line 34 is low, thereby inhibiting AND gates 102. Consequently, the rank value bits are eliminated on conductors AL0-AL2 and at input 44 of comparator 43. The condition of the bus is stored in latch 238.

If the Bus Accessed latch 208 was set at the preceding up-going transition of signal CL2, AND gate 206 is inhibited, the SEL PR signal on line 35 is low, AND gates 100 are inhibited, the priority level bits are not placed on conductors AL0-AL2, the unit shall not participate in the selection process at the next up-going transition of signal CL0, since, in this instance, the selected request would be serviced during the next cycle, and no other requests will be taken into consideration.

AND gate 230 provides a high output signal which resets Request latch 200.

The addresses are now compared. If an equality is detected and if the bus is not busy (line 4 being at the 0 level), then AND gate 234 provides a high signal on Request Granted line 8-i. If the bus is busy, then AND gate 234 is inhibited and a low signal is provided on line 8-i, thereby indicating that the request may not be selected.

If no equality between the address bits is detected, AND gate 232 provides a high output signal on Error line 9-i.

If the bus has not been accessed and if a request is stored in latch 200, AND gate 206 supplies a high output signal on SEL PR line 35, which signal opens AND gates 100 to transfer the priority level bits to bus 40 and, therefore, to conductors AL0-AL2.

A new cycle may now begin.

Figure 8:
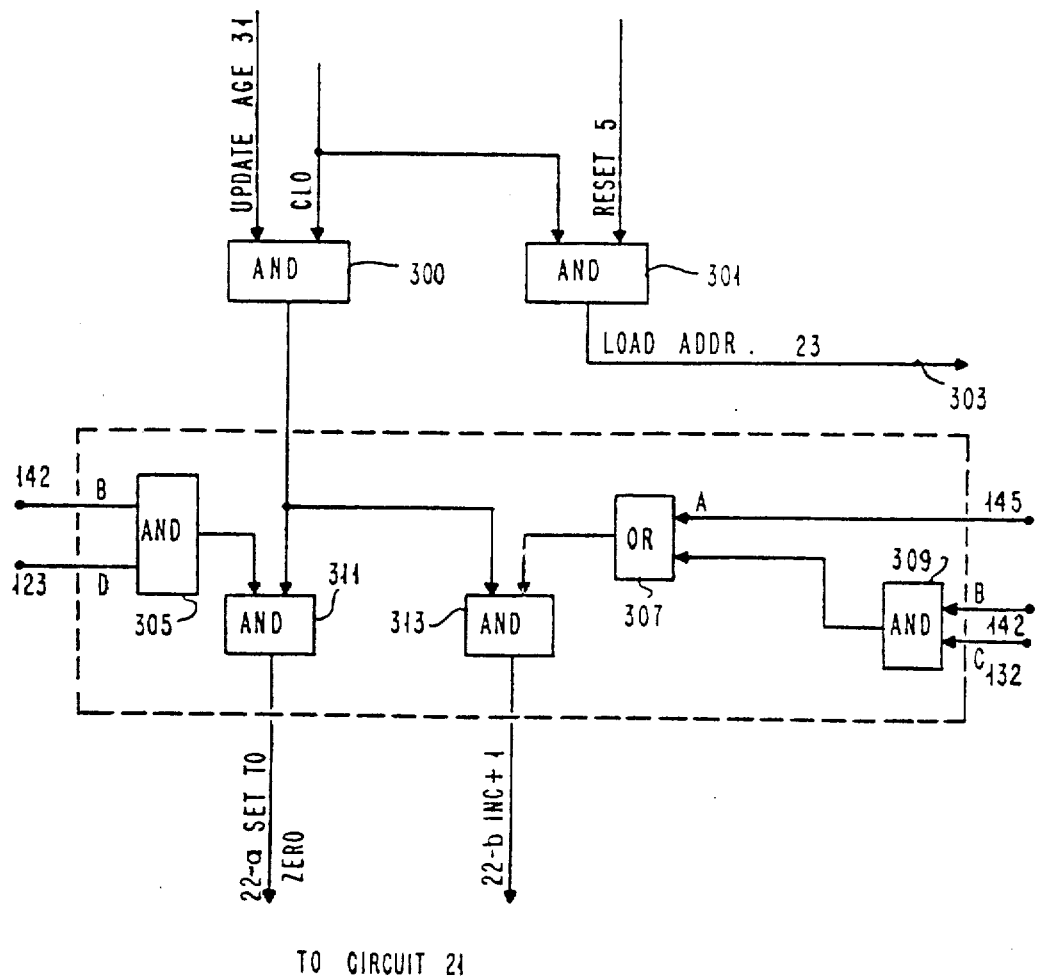
FIG. 8 is a schematic diagram of the age updating circuit 21 of FIG. 4.

Referring now to FIG. 8, the age updating circuit will be described.

The circuit includes two AND gates 300 and 301. AND gate 300 has two inputs, one of which receives signal CL0 and the other of which is connected to age Update line 31, which is up if the bus was found to be available and if the age of every arbitration circuit is to be updated, in accordance with the following algorithm:

AGE OF SELECTED UNIT→0
AGE X OF UNITS WHOSE AGE IS<AGE OF SELECTED UNIT→X+1
AGE Y OF UNITS WHOSE AGE IS>AGE OF SELECTED UNIT→Y

The update is carried out by logic circuit 303.

AND gate 301 receives as one input the signal CL0 and as another input the Reset signal present on line 5 to generate on line 23, upon resetting the system, a high output signal which causes the physical address to be loaded into age register 20.

Four comparison signals are supplied by latches 123, 126 (FIG. 6C) and 136, 145 (FIG. 6D).

If we put $A=(G_B>G_U)$, then $A=1$ if $G_B>G_U$ is provided by latch 139 on output 145.

If we put $B=(G_B=G_U)$, then $B=1$ if $G_B=G_U$ is provided by latch 136 on output 142.

$G_B<G_U$ is not supplied by comparison circuits 43, 50 but is equal to $\overline{A.B} = \overline{A}+\overline{B}$.

If we put $C=(R_B>R_U)$, then $C=1$ if $R_B>R_U$ is provided by latch 126 on output 132.

If we put $D=(R_B=R_U)$, then $D=1$ if $R_B=R_U$ is provided by latch 123 on output 129.

$R_B<R_U$ is not supplied by comparison circuits 43, 50 but is equal to $\overline{C} . \overline{D} = \overline{C+D}$.

Circuit 303 must provide two signals, "increment+1" and "set to zero", such that $INC.+1 = A+BC$.

Set to zero = BD. Circuit 303 includes an AND gate 305, which performs the logic operation BD. OR gate 307 and AND gate 309 perform the logic operation $A+BC$.

Two AND gates 311 and 313 are activated by the output signal from AND gate 300 to cause the age to be updated at the up-going transition of signal CL0 and to provide on the Reset to Zero output the result of operation BD as supplied by AND gate 305 and on the INC+1 output the result of operation $A+BC$.

These two outputs are applied to age register via lines 22-a and 22-b.

While the invention has been shown and described with reference to a preferred embodiment thereof it will be understood by those skilled in the art that various changes in form and details may be made therein without departing from the spirit and scope of the invention.

We claim:

1. An arbitration method for a data processing system wherein N units share a common resource, for allocating said resource to a selected unit, a request for access to said resource being made by each unit that desires to gain access thereto, and wherein a priority level is assigned to the requests and only those requests having the highest priority level being considered for selection, said method being characterized in that it includes the steps of:

assigning an initial age value to each unit, each age value corresponding to the age of the request that will be made by the unit, and each age value being encoded by means of group and rank values, selecting during an arbitration cycle a unit whose request will be serviced if the shared resource is available, the selected unit being the one whose group and rank values correspond to the oldest request, and updating the age value associated with each unit when a request has been selected and the resource is available, with the age of the selected unit assuming a value corresponding to that of the most recent request, the ages of the units not selected that correspond to requests more recent than the one made by the selected unit being increased by a given quantity, and the ages of the units not selected that correspond to requests older than the one made by the selected unit remaining unchanged.

2. An arbitration method according to claim 1, characterized in that:

the initial age of the requests made by each unit corresponds to the physical address 0 to N-1 of said units, the N ages being encoded by means of a group value selected from p group values and, for each group value, by means of a rank value selected from q rank values, with $p \times q \geq N$, and the age defined by values $p=0$ and $q=0$ corresponding to the most recent request, p and q being encoded by means of a binary code such as the "1 out of N" code, the selection step including a step of:

determining those requests which have the highest group value and selecting therefrom the request having the highest rank value in order that it may be serviced during the next cycle if the resource is found to be available.

* * * * *